US011447242B2

United States Patent
Haldeman et al.

(10) Patent No.: US 11,447,242 B2
(45) Date of Patent: Sep. 20, 2022

(54) PITCH HORN JOINT

(71) Applicant: Bell Textron Inc., Fort Worth, TX (US)

(72) Inventors: Andrew Paul Haldeman, Fort Worth, TX (US); Paul Wayne Woolbright, Euless, TX (US); Bryan Baskin, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 64 days.

(21) Appl. No.: 17/082,659

(22) Filed: Oct. 28, 2020

(65) Prior Publication Data
US 2022/0126993 A1   Apr. 28, 2022

(51) Int. Cl.
*B64C 27/605* (2006.01)
*B64C 27/82* (2006.01)

(52) U.S. Cl.
CPC ............ *B64C 27/605* (2013.01); *B64C 27/82* (2013.01)

(58) Field of Classification Search
CPC .............................. B64C 27/82; B64C 27/605
See application file for complete search history.

(56) References Cited

U.S. PATENT DOCUMENTS

| 5,297,934 | A | * | 3/1994 | Desjardins | B64C 27/58 416/163 |
| 5,415,525 | A | * | 5/1995 | Desjardins | B64C 27/78 416/168 R |
| 2014/0321968 | A1 | * | 10/2014 | Kreitmair-Steck | B64C 27/82 415/228 |
| 2019/0100300 | A1 | * | 4/2019 | Haldeman | B64C 27/48 |
| 2019/0283868 | A1 | * | 9/2019 | Davis | B64C 27/82 |
| 2020/0407044 | A1 | * | 12/2020 | Wilson | B64C 27/605 |

* cited by examiner

*Primary Examiner* — Tye William Abell
(74) *Attorney, Agent, or Firm* — Akona IP PC

(57) ABSTRACT

A rotor assembly includes a pitch spider, rotor blade assemblies, and pitch horn joints. The pitch spider has a body and pitch spider legs extending from the body. Each blade rotor assembly includes a rotor blade, a pitch adapter joined to the rotor blade and connecting the rotor blade to the rotor hub, and a pitch horn. Each pitch horn joint joins one of the rotor blade assemblies to a corresponding pitch spider leg. Each pitch horn joint includes a pitch horn joint bolt extending from the pitch horn of the rotor blade assembly to the pitch spider leg along a pitch horn joint axis, the pitch horn joint bolt fixed to the pitch horn; a spherical bearing having an inner ring and an outer ring; and a slider sleeve coupled to the spherical bearing, the slider sleeve enabling the pitch horn to translate along the pitch horn joint axis.

20 Claims, 6 Drawing Sheets

PITCH HORN JOINT

GOVERNMENT RIGHTS

This invention was made with Government support under Agreement No. W911W6-19-9-0002, awarded by the Army Contracting Command-Redstone Arsenal. The United States Government has certain rights in the invention.

TECHNICAL FIELD

This disclosure relates in general to the field of aircraft and, more particularly, though not exclusively, to a pitch horn joint for use in rotors that use a pitch spider for blade pitch articulation.

BACKGROUND

Some rotor systems used in aircraft have blades that can change pitch. One mechanism for changing the pitch of rotor blades is a pitch spider. A pitch spider connects to the blades in the rotor, and translating the pitch spider along a mast axis of the rotor changes the pitch of the blades. The pitch spider connects to each rotor blade at a joint that has multiple degrees of freedom. For example, some existing pitch spiders use a ball in socket joint, where a ball connected to the rotor blade can articulate within a socket connected to the pitch spider. Other pitch spiders use a ball in cylinder joint, where a ball connected to the rotor blade can articulate within a cylinder connected to the pitch spider, and translate along the length of the cylinder.

SUMMARY

One embodiment is a rotor assembly that includes a rotor hub, a pitch spider, a plurality of rotor blade assemblies, and a plurality of pitch horn joints. The pitch spider includes a central body and a plurality of pitch spider legs extending from the central body. Each of the plurality of rotor blade assemblies includes a rotor blade, a pitch adapter joined to the rotor blade and connecting the rotor blade to the rotor hub, and a pitch horn. Each of the plurality of pitch horn joints joins one of the plurality of rotor blade assemblies to a corresponding one of the plurality of pitch spider legs. Each pitch horn joint includes a pitch horn joint bolt extending from the pitch horn of the rotor blade assembly to the pitch spider leg along a pitch horn axis, the pitch horn joint bolt fixed to the pitch horn. Each pitch horn joint further includes a spherical bearing having an inner ring and an outer ring. Each pitch joint further includes a slider sleeve coupled to the spherical bearing, the slider sleeve enabling the pitch horn to translate relative to the pitch spider leg along the pitch horn joint axis.

In one example, the outer ring of the spherical bearing is fixed to the pitch spider leg, and the inner ring of the spherical bearing is coupled to the slider sleeve. The slider sleeve may be fixed to the pitch horn joint bolt, and the slider sleeve may be configured to slide along the inner ring of the spherical bearing to translate the pitch horn.

In another example, the inner ring of the spherical bearing is fixed to the pitch horn joint bolt, and outer ring of the spherical bearing is coupled to the slider sleeve. An outside of the slider sleeve may be fixed to the pitch spider leg, and the outer ring of the spherical bearing may be configured to slide along an inside of the slider sleeve to translate the pitch horn.

A bearing stress on the pitch horn joint maybe distributed across a width of the spherical bearing. The pitch spider may be configured to translate along a rotor hub axis, and a translation of the pitch spider along the rotor hub axis may rotate each of the plurality of rotor blade assemblies about a respective pitch change axis. The rotor assembly may further include a plurality of tension-torsion straps each attaching one of the rotor blade assemblies to the rotor hub.

Another embodiment is an aircraft that includes a tail rotor that includes a rotor hub, a pitch spider, a plurality of rotor blades, a plurality of pitch adapters, and a plurality of pitch horn joints. The pitch spider includes a central body and a plurality of pitch spider legs extending from the central body. Each of the plurality of rotor blades corresponds to one of the plurality of pitch spider legs. Each of the plurality of pitch adapters is joined to a respective one of the rotor blades and connects the rotor blade to the rotor hub. Each of the plurality of pitch adapters includes a pitch horn. Each of the plurality of pitch horn joints joins one of the plurality of pitch adapters to a corresponding one of the plurality of pitch spider legs. Each pitch horn joint includes a pitch horn joint bolt extending from the pitch horn of the pitch adapter to the pitch spider leg along a pitch horn joint axis, the pitch horn joint bolt fixed to the pitch horn of the pitch adapter; and a spherical bearing having an inner ring and an outer ring; and a slider sleeve coupled to the spherical bearing, the slider sleeve enabling the pitch horn to translate relative to the pitch spider leg along the pitch horn joint axis.

In one example, the outer ring of the spherical bearing is fixed to the pitch spider leg, and the inner ring of the spherical bearing is coupled to the slider sleeve. The slider sleeve may be fixed to the pitch horn joint bolt, and the slider sleeve may be configured to slide along the inner ring of the spherical bearing to translate the pitch horn.

In another example, the inner ring of the spherical bearing is fixed to the pitch horn joint bolt, and outer ring of the spherical bearing is coupled to the slider sleeve. An outside of the slider sleeve may be fixed to the pitch spider leg, and the outer ring of the spherical bearing may be configured to slide along an inside of the slider sleeve to translate the pitch horn.

A bearing stress on the pitch horn joint maybe distributed across a width of the spherical bearing. The pitch spider may be configured to translate along a rotor hub axis, and a translation of the pitch spider along the rotor hub axis may rotate each of the plurality of rotor blades about a respective pitch change axis. The rotor assembly may further include a plurality of tension-torsion straps each attaching one of the pitch adapters to the rotor hub.

Another embodiment is a pitch horn joint between a pitch spider and a pitch adapter of a rotor blade, the pitch horn joint including a pitch horn joint bolt, a spherical bearing having an inner ring and an outer ring, and a slider sleeve coupled to the spherical bearing. The pitch horn joint bolt extends along a pitch horn joint axis from a pitch horn of the pitch adapter to a pitch spider leg of the pitch spider, the pitch horn joint bolt fixed to the pitch horn of the pitch adapter. The slider sleeve enables the pitch horn of the pitch adapter to translate along the pitch horn joint axis.

In one example, the outer ring of the spherical bearing is fixed to the pitch spider leg, and the inner ring of the spherical bearing is coupled to the slider sleeve. The slider sleeve may be fixed to the pitch horn joint bolt, and the slider sleeve may be configured to slide along the inner ring of the spherical bearing to translate the pitch horn. A bearing stress on the pitch horn joint maybe distributed across a width of the spherical bearing.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
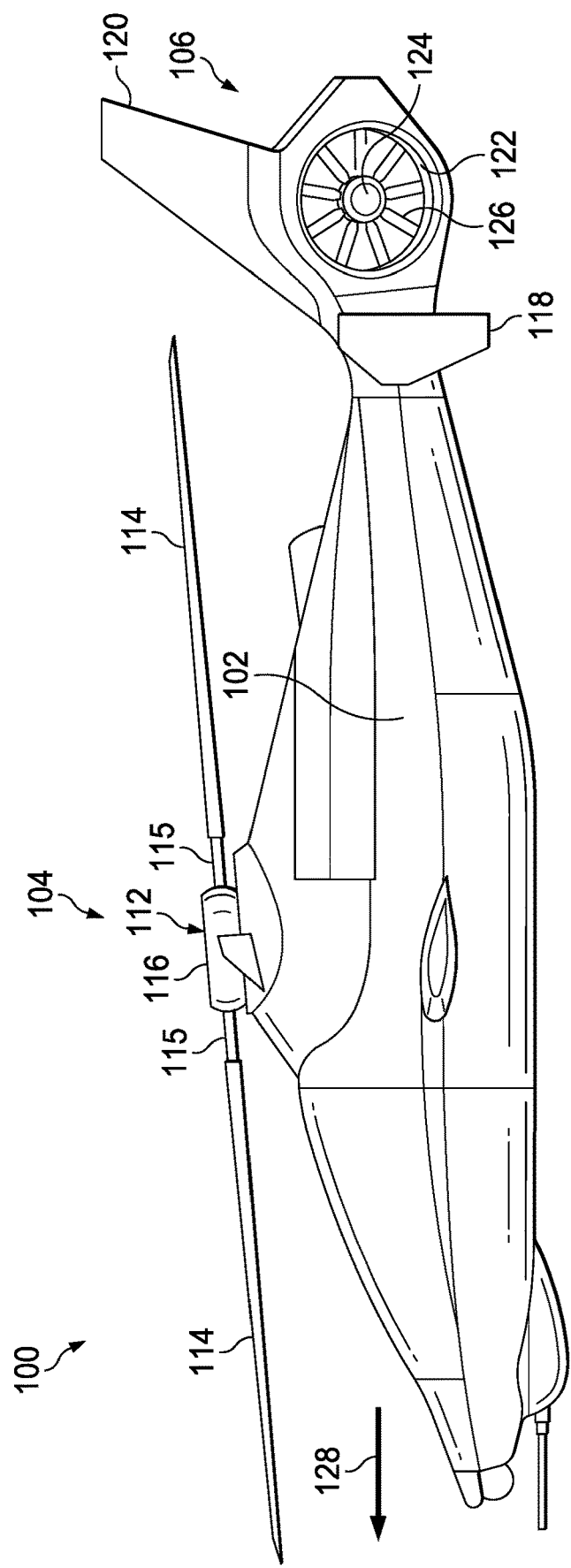
FIG. 1 illustrates a side view of an example aircraft having one or more rotor systems employing a pitch horn joint in accordance with certain embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Embodiments described herein provide a pitch horn joint that connects a leg of a pitch spider to a blade assembly that includes a pitch horn. Moving the pitch spider changes the pitch of the blade assembly. The pitch horn joint includes a spherical bearing that slides along a slider sleeve. The slider sleeve allows for translation of the blade assembly relative to the pitch spider. The spherical bearing allows angular articulation of the joint.

Rotors that use pitch spiders typically use the pitch spider to control the pitch of the rotor blades, and tension-torsion straps to anchor the rotor blades to the rotor hub. The tension-torsion straps resist centrifugal force while allowing the rotor blades to change pitch. Pitch horn joints connect the pitch spider to the rotor blades, and the pitch horn joints withstand the stresses on the rotor assembly of maintaining the blades in a pitched position as the rotor is rotated about its axis. The load on the pitch horn joint increases non-linearly as the size of the rotor increases. In some previous pitched rotors, a ball-in-cylinder joint was used at the pitch horn joint. The contact between the ball portion of the joint and the cylinder is a circular line contact. The ball-in-cylinder joint is simple to construct and adequately manages stresses on the joint for relatively small scales and loads, e.g., for rotors under 4 feet in diameter. However, for larger rotor (e.g., rotors greater than 4 feet or greater than 4.5 feet in diameter), the stress on the pitch horn joint may be too great for the circular line contact of the ball-in-cylinder joint to withstand.

The pitch horn joints described herein include a spherical bearing, which provides a larger contact area within the joint than previous ball-in-cylinder joints. The larger contact area allows the pitch horn joint to withstand greater forces at larger rotor sizes. The pitch horn joint further has a translational degree of freedom provided by a slider sleeve. As the pitch spider translates along the hub axis to pitch the blade, the distance between the pitch spider leg and the pitch horn of the blade assembly changes, and the slider sleeve accommodates the translation of the pitch spider relative to the pitch horn.

Figure 2:
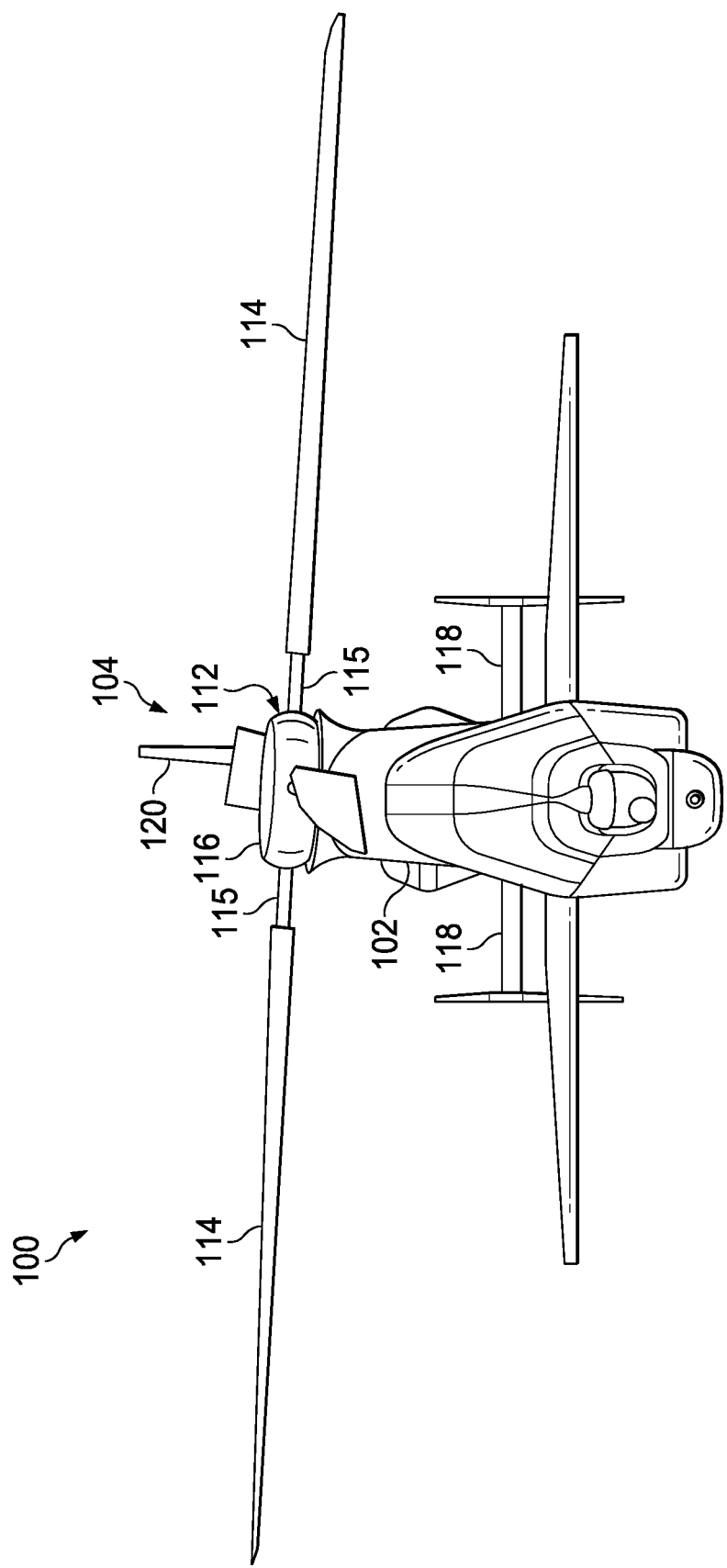
FIG. 2 illustrates a front plan view of the aircraft shown in FIG. 1.

Referring to FIGS. 1 and 2, illustrated therein are different views (i.e., a side view and a front view, respectively) of an example embodiment of an aircraft, which in the illustrated example is a rotorcraft 100. As shown in FIGS. 1 and 2, rotorcraft 100 includes a fuselage 102, a primary rotor system 104, and an empennage 106. The fuselage 102 is the main body of the rotorcraft 100, which may include a cabin (e.g., for crew, passengers, and/or cargo) and/or may house certain mechanical components, electrical components, etc. (e.g., engine(s), transmission, flight controls, etc.).

The rotor system 104 is used to generate lift for rotorcraft 100. For example, the rotor system 104 (also generally referred to as the "rotor") may include a rotor hub 112 (also referred to as a "rotor hub assembly" or more generally as a "hub") coupled to a plurality of rotor blades 114 (also referred to generally as "blades") that extend radially from the rotor hub 112 via blade extensions 115. Torque generated by the engine(s) of the rotorcraft causes the rotor blades 114 to rotate, which generates lift. In accordance with features of embodiments disclosed herein, the rotor hub 112 is completely shrouded by a rotor hub fairing 116.

Rotorcraft 100 relies on rotor system 104 for flight capabilities, such as controlling (e.g., managing and/or adjusting) flight direction, thrust, and lift of the rotorcraft. For example, the pitch of each rotor blade 114 can be controlled using collective control or cyclic control to selectively control direction, thrust, and lift of the rotorcraft 100. During collective control, all of the rotor blades 114 are collectively pitched together (e.g., the pitch angle is the same for all blades), which affects overall thrust and lift. During cyclic control, the pitch angle of each of the rotor blades 114 varies depending on where each blade is within a cycle of rotation (e.g., at some points in the rotation the pitch angle is not the same for all blades), which can affect direction of travel of the rotorcraft 100.

Aircraft such as rotorcraft 100 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades", "yoke/blades", "hub/yoke/blades", and variations thereof) to flapping, leading and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the hub/yoke flap. For example, for rotorcraft 100, the most aft blade (e.g., nearest to tail rotor or anti-torque system 122) of the rotor system 104 may be pitched more nose-up and the most forward blade may be pitched more nose-down; to provide a forward direction of travel (as generally indicated by arrow 128) for rotorcraft 100.

The empennage 106 of the rotorcraft 100 includes a horizontal stabilizer 118, a vertical stabilizer 120, and a tail rotor or anti-torque system 122. Although not shown in the view illustrated in FIG. 1, a corresponding horizontal stabilizer is disposed on the other side of the rotorcraft 100 opposite the horizontal stabilizer 118. The horizontal stabilizer 118 and vertical stabilizer 120 respectively provide horizontal and vertical stability for the rotorcraft 100. The tail rotor or anti-torque system 122 is used to provide anti-torque and/or direction control for the rotorcraft 100. The tail rotor in the example shown in FIG. 1 is a ducted tail rotor that includes a hub 124 and blades 126 surrounded by a duct. The set of rotor blades 126 extend radially from the rotor hub 124, and the rotor hub 124 rotates about a mast axis through the center of the rotor hub 124. In a neutral position, the rotor blades 126 are along a neutral blade plane that is perpendicular to the mast axis of the rotor hub 124. The rotor hub 124 controls the pitch angle of the rotor blades 126, e.g., using a pitch spider described further below. The rotor system 122 has a pitch envelope bounded by a minimum blade angle and a maximum blade angle, and the rotor hub 124 can pitch the rotor blades 126 to different positions within this pitch envelope.

Figure 3:
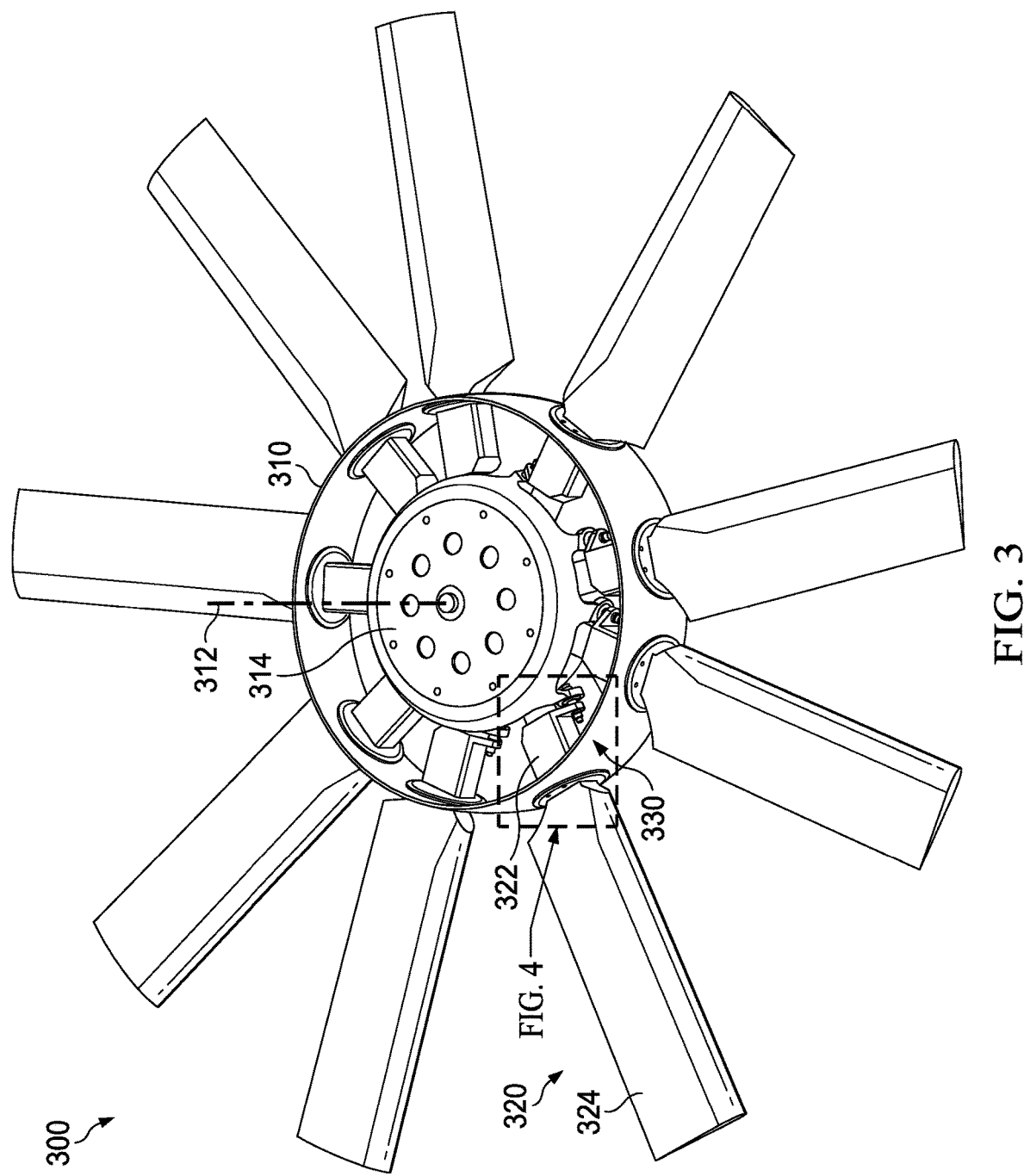
FIG. 3 illustrates a top isometric view of a rotor system having pitch horn joint in accordance with embodiments described herein.

FIG. 3 illustrates a top isometric cutaway view of a rotor assembly 300. The rotor assembly 300 may be an example of the tail rotor 122 shown in FIG. 1, or the main rotor 104 shown in FIG. 1. In other examples, the rotor assembly 300 may be a rotor assembly used another application, e.g., a propeller of a fixed wing aircraft or a tiltrotor aircraft. The rotor assembly 300 includes a rotor hub 310 and a set of blade assemblies 320 connected to the rotor hub 310. Each of the blade assemblies 320 includes a pitch adapter 322 that extends into the rotor hub 310 and a blade 324 that extends outward from the rotor hub 310. The pitch adapter 322 joins to the blade 324 and connects the blade 324 to the rotor hub 310.

The rotor hub 310 has a rotor hub axis 312 that extends through the center of the rotor hub 310. The rotor hub 310 includes a pitch spider 314 that is centered on the rotor hub axis 312. The pitch spider 314 connects to each of the blade assemblies 320 at a pitch horn joint 330. The pitch spider 314 translates up and down along the rotor hub axis 312 to change the pitch of the blades 324, i.e., to rotate the blades 324 about a pitch change axis, shown in FIGS. 5 and 6. In the example shown in FIG. 3, if the pitch spider 314 translates upwards along the rotor hub axis 312, this pitches the leading edge of the blade 324 upwards; if the pitch spider 314 translates downwards along the rotor hub axis 312, this pitches the leading edge of the blade 324 downward. The pitch horn joint 330 connecting the pitch spider 314 to one of the rotor blade assemblies 320 is shown in greater detail in FIGS. 4-6.

Figure 5:
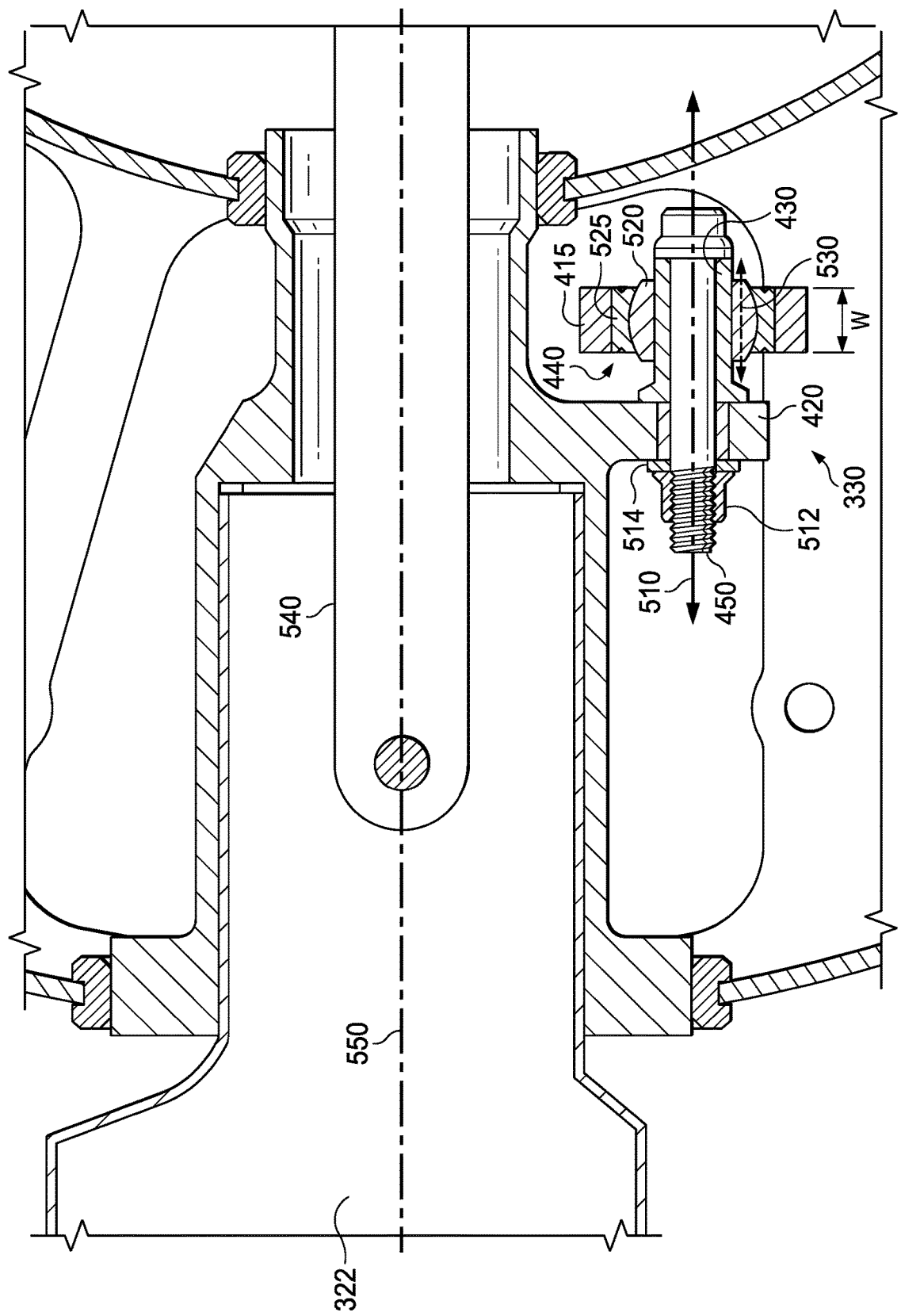
FIG. 5 illustrates a cross-section of the pitch horn joint shown in FIGS. 3 and 4.
Figure 6:
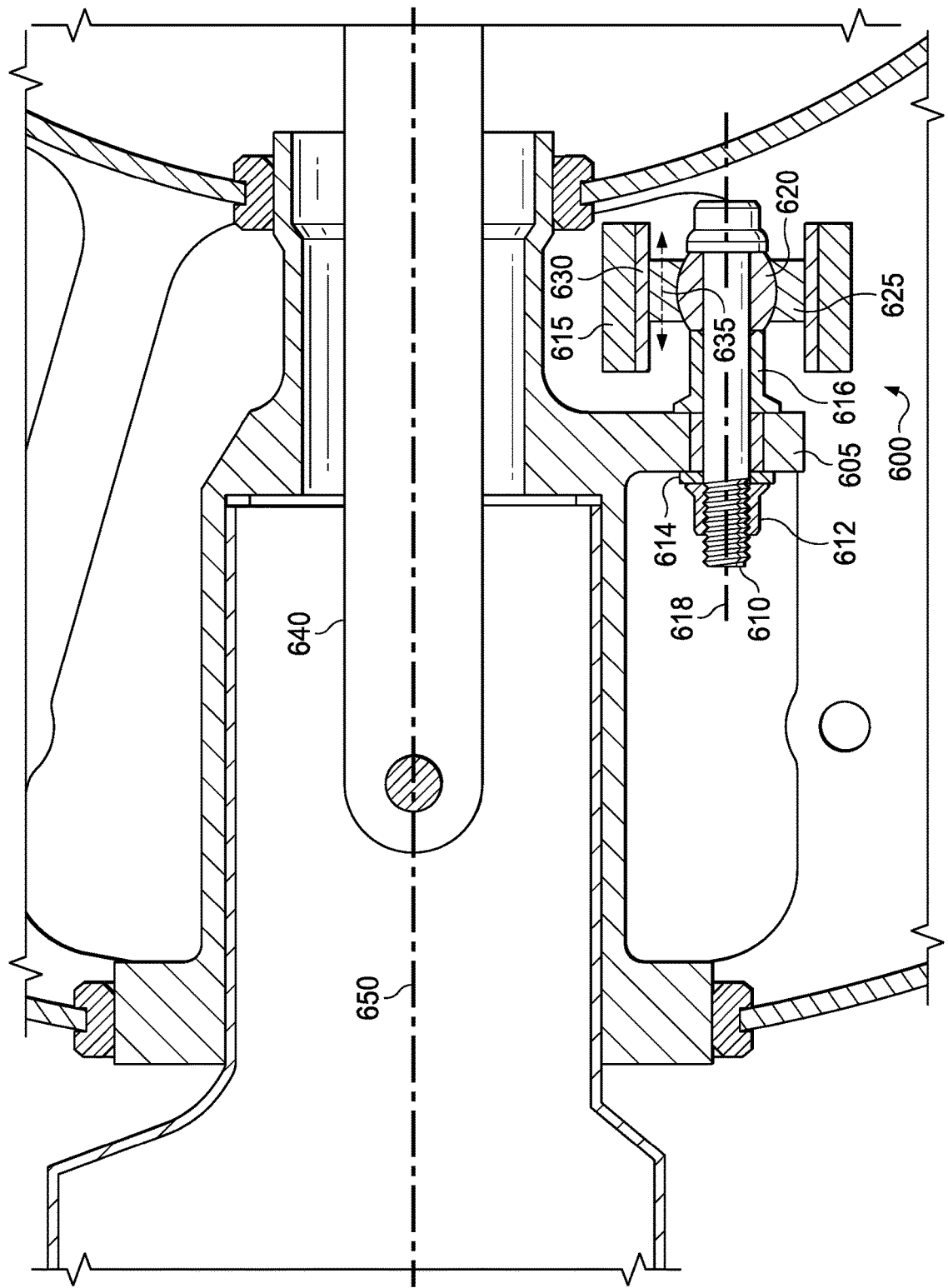
FIG. 6 illustrates a cross section of an alternate embodiment of a pitch horn joint.

The view shown in FIG. 3 shows certain components of the rotor assembly 300 while other components are not depicted or are hidden from view. For example, the rotor hub 310 includes a hub housing, a portion of which is shown in FIG. 3, and a drive hub located underneath the pitch spider 314. A mast attaches to the drive hub along the rotor hub axis 312 and rotates the rotor assembly 300 about the rotor hub axis 312. The pitch adapters 322 may be fastened to tension-torsion straps that are also fastened to the drive hub underneath the pitch spider. Example cross-sections showing the tension-torsion straps are shown in FIGS. 5 and 6.

Figure 4:
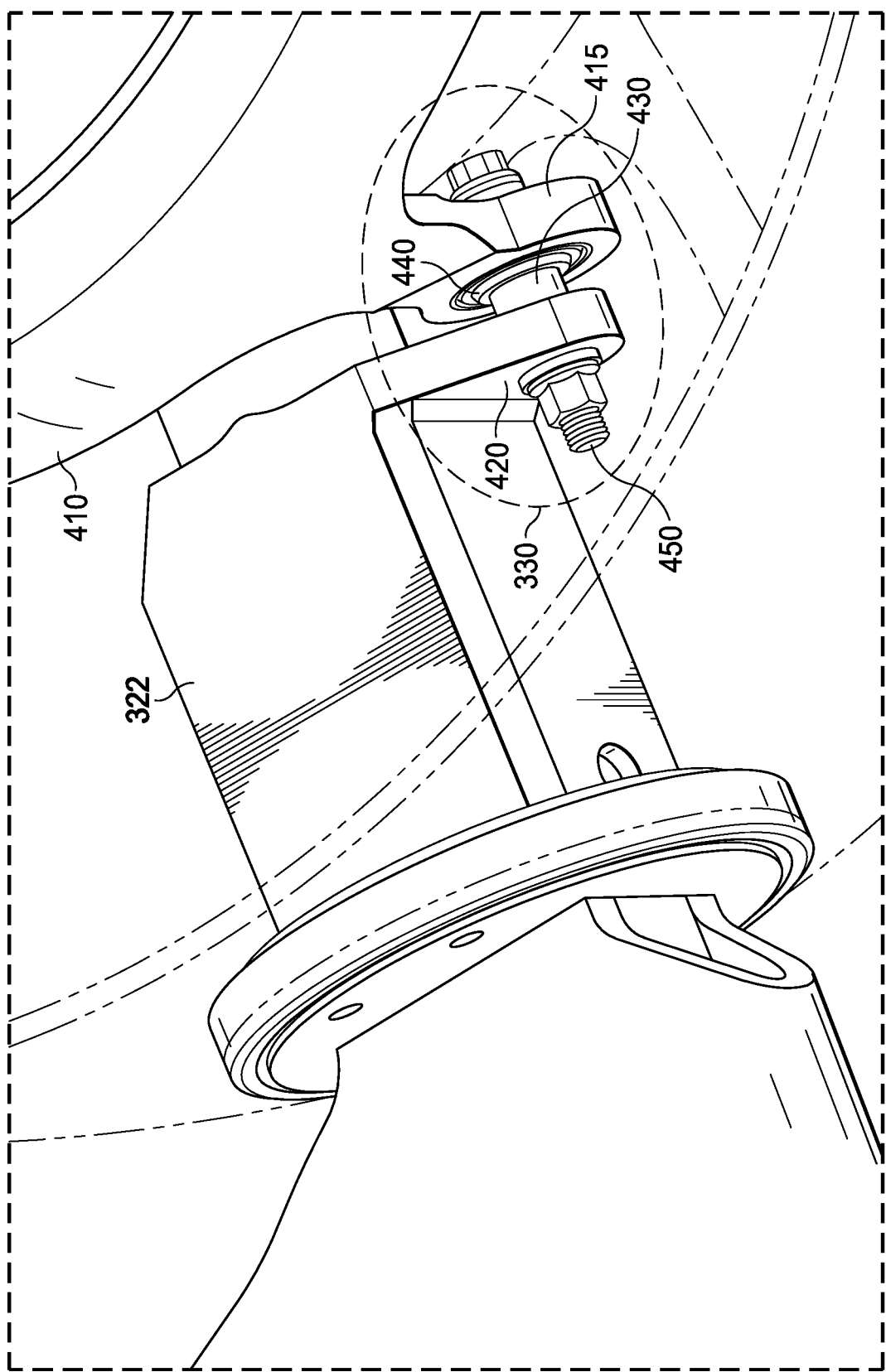
FIG. 4 illustrates a detailed view one of the pitch horn joints shown in FIG. 3.

FIG. 4 illustrates a close-up view showing one of the pitch horn joints 330 shown in FIG. 3. FIG. 4 further shows the connections between the pitch adapter 322, the pitch horn joint 330, and the pitch spider 314. The pitch adapter 322 has a pitch horn 420 extending from one side. As shown in FIG. 3, the pitch horn 420 is an integral piece of the pitch adapter 322 that extends off the side of the pitch adapter 322 corresponding to the leading edge of the blade 324. In other embodiments, the pitch horn 420 may extend from the side of the pitch adapter 322 corresponding to the trailing edge of the blade 324.

The pitch spider 314 includes a pitch spider body 410 that makes up the central portion of the pitch spider 314 around the rotor hub axis 312. The pitch spider 314 also includes a set of pitch spider legs 415 extending from the pitch spider body 410. Each of the pitch spider legs 415 corresponds to one of the rotor blade assemblies 320 and connects the pitch spider 314 to a corresponding pitch horn joint 330.

The pitch horn joint 330 joins a pitch spider leg 415 to a pitch horn 420. The pitch horn joint 330 includes a slider sleeve 430, a spherical bearing 440, and a pitch horn joint bolt 450. The slider sleeve 430 allows the pitch horn 420 to translate away from the pitch spider leg 415 and towards the pitch spider leg 415 as the pitch spider 314 changes the pitch of the blade assembly 320. In the example shown in FIG. 4, the slider sleeve 430, pitch horn joint bolt 450, and pitch horn 420 are fixed to each other. The slider sleeve 430 is coupled to the spherical bearing 440, and the pitch horn joint bolt 450 and the slider sleeve 430 slide into and out of an inner ring of the spherical bearing 440. The spherical bearing 440 is fixed to the pitch spider leg 415. The spherical bearing 440 enables angular rotation of the pitch horn joint bolt 450 and the slider sleeve 430 about the spherical bearing 440.

FIG. 5 illustrates a cross-section of the pitch horn joint 330 and pitch adapter 322. A joint axis 510 is shown extending through the pitch horn joint 330. The pitch horn joint bolt 450 extends from the pitch horn 420 to the pitch spider leg 415 along the joint axis 510. As noted above, in this embodiment, the slider sleeve 430 is fixed to the pitch horn joint bolt 450. The pitch horn joint bolt 450 and slider sleeve 430 are fixed to the pitch horn 420 by a nut 512; the end of the pitch horn joint bolt 450 extending out of the pitch horn 420 in the direction of the blade assembly 320 is threaded and fastened to the nut 512, which is separated from the pitch horn 420 by a spacer 514 (e.g., a washer).

The spherical bearing 440 includes an inner ring 520, which may also be referred to as a ball, and an outer ring 525, which may also be referred to as a race. The outer ring 525 is fixed to the pitch spider leg 415. The inner ring 520 can rotate within the outer ring 525, allowing the slider sleeve 430 and pitch horn joint bolt 450 to change angle relative to the outer ring 525 and pitch spider leg 415. The slider sleeve 430 is coupled to the inner ring 520 and enables the pitch horn 420 to translate relative to the pitch spider leg 415 along the joint axis 510, moving the pitch horn 420 away from or towards the pitch spider leg 415 as the pitch of the blade assembly 320 changes. A slide zone 530 drawn in FIG. 5 indicates the length along the slider sleeve 430 that the inner ring 520 can translate.

As described above, the rotation of the rotor system, especially when the blade assembly 320 is pitched away from a neutral position, puts stress on the pitch horn joint 330. A bearing stress on the pitch horn joint 330 is distributed across a width W of the spherical bearing 440. Distributing the stress across a greater portion of the joint than in prior pitch horn joints allows the pitch horn joint 330 to be used in larger, more highly loaded rotors.

As noted above, the pitch spider 314 controls the pitch angle of the blade assembly 320. More particularly, motion of the pitch spider 314 causes each blade assembly 320 to rotate about a respective pitch change axis 550 to change the pitch angle. The pitch change axis 550 extends through the center of the pitch adapter 322 towards the rotor hub axis 312 shown in FIG. 3. The blade assembly 320 is held to the drive hub, which fits underneath the pitch spider 314 in the view shown in FIG. 3, by a tension-torsion strap. An example tension-torsion strap 540 is shown extending radially from the drive hub and through an inside of the pitch adapter 322 and attaching to the pitch adapter 322. The tension-torsion strap 540 attaches to a mounting point on the drive hub, not shown in FIG. 5.

FIG. 6 illustrates a cross section of an alternate embodiment of a pitch horn joint 600. The example shown in FIG. 6 flips the positions of the slider sleeve and the spherical bearing relative to FIG. 5. In particular, the inner ring 620 of the spherical bearing is fixed to the pitch horn joint bolt 610, and the outer ring 625 of the spherical bearing is coupled to the slider sleeve 630. The pitch horn joint bolt 610 and inner ring 620 of the spherical bearing are fixed to the pitch horn 605 by a nut 612; the end of the pitch horn joint bolt 610 extending out of the pitch horn 605 in the direction of the blade assembly is threaded and fastened to the nut 612, which is separated from the pitch horn 605 by a spacer 614 (e.g., a washer). In addition, a bearing spacer 616 separates the pitch horn 605 and the inner ring 620 of the spherical bearing and holds the spherical bearing in a fixed position along a pitch horn joint axis 618 relative to the pitch horn 605.

The outside of the slider sleeve 630 is fixed to the pitch spider leg 615. The outer ring 625 of the spherical bearing is configured to slide along the inside of the slider sleeve 630 to translate the pitch horn 605 relative to the pitch spider leg 615. A slide zone 635 drawn in FIG. 6 indicates the length along the slider sleeve 630 that the outer ring 625 can translate. The inner ring 620 of the spherical bearing can rotate freely within the outer ring 625, allowing the pitch horn joint bolt 610 to change angle relative to the outer ring 625, slider sleeve 630, and pitch spider leg 615.

The environment around the pitch horn joint 600 (e.g., the pitch adapter, the tension-torsion strap, the rotor hub, the pitch spider, etc.) are similar to the environment shown around the pitch horn joint 330 shown and described with respect to FIGS. 3-5. For example, the pitch spider controls the pitch angle of the blade assembly by causing the blade assembly to rotate about a pitch change axis 650 in the same manner described above. The blade assembly is held to the drive hub by a tension-torsion strap 640, which attaches to a mounting point on the drive hub, as described above.

It should be appreciated that the pitch horn joint described herein can be used in various applications of rotors that use pitch spiders to pitch rotor blades. Indeed, the various embodiments of the pitch horn joint, and rotors that include the pitch horn joints, described herein may be used on any aircraft that utilizes rotors, such as helicopters, tiltrotor aircraft, hybrid aircraft, dual tiltrotor aircraft, unmanned aircraft, gyrocopters, airplanes, commuter aircraft, electric aircraft, hybrid-electric aircraft, ducted fan aircraft having any number of ducted fans, tiltwing aircraft, including tiltwing aircraft having one or more interwing linkages, more or fewer ducted fans or non-ducted rotors and the like. While the rotor assembly 300 is shown with nine rotor blade assemblies 320, it should be understood that the pitch horn joint described herein may be used in rotor assemblies having as few as two rotor blades or more than nine rotor blades, with each rotor blade having a respective pitch horn joint connecting the rotor blade assembly to the rotor hub.

The components of the rotor assemblies and pitch horn joints described herein may comprise any materials suitable for use with an aircraft rotor. For example, the pitch spider 314 and pitch horn 420 may comprise aluminum. The spherical bearing 440 may be made of a stainless steel alloy, with a PTFE (Polytetrafluoroethylene) liner between the outer and inner rings. In some embodiments, the inner bore diameter of the inner ring is also lined, e.g., with a PTFE liner. The slider sleeve 430 may comprise stainless steel.

Example 1 is a rotor assembly including a rotor hub, a plurality of rotor blade assemblies, and a plurality of pitch horn joints. The rotor hub includes a pitch spider that has a central body and a plurality of pitch spider legs extending from the central body. Each rotor blade assembly includes a rotor blade, a pitch adapter joined to the rotor blade and connecting the rotor blade to the rotor hub, and a pitch horn. Each of the pitch horn joints joins one of the plurality of rotor blade assemblies to a corresponding one of the plurality of pitch spider legs. Each pitch horn joint includes a pitch horn joint bolt extending from the pitch horn of the rotor blade assembly to the pitch spider leg along a pitch horn joint axis, the pitch horn joint bolt fixed to the pitch horn; a spherical bearing having an inner ring and an outer ring; and a slider sleeve coupled to the spherical bearing, the slider sleeve enabling the pitch horn to translate relative to the pitch spider leg along the pitch horn joint axis.

Example 2 provides the rotor assembly according to example 1, where the outer ring of the spherical bearing is fixed to the pitch spider leg, and the inner ring of the spherical bearing is coupled to the slider sleeve.

Example 3 provides the rotor assembly according to either of the previous examples, where the slider sleeve is fixed to the pitch horn joint bolt, and the slider sleeve is configured to slide along the inner ring of the spherical bearing to translate the pitch horn.

Example 4 provides the rotor assembly according to example 1, where the inner ring of the spherical bearing is fixed to the pitch horn joint bolt, and the outer ring of the spherical bearing is coupled to the slider sleeve.

Example 5 provides the rotor assembly according to example 1 or example 4, where an outside of the slider sleeve is fixed to the pitch spider leg, and the outer ring of the spherical bearing is configured to slide along an inside of the slider sleeve to translate the pitch horn.

Example 6 provides the rotor assembly according to any of the previous examples, where a bearing stress on the pitch horn joint is distributed across a width of the spherical bearing.

Example 7 provides the rotor assembly according to any of the previous examples, where the pitch spider is configured to translate along a rotor hub axis, and a translation of the pitch spider along the rotor hub axis rotates each of the plurality of rotor blade assemblies about a respective pitch change axis.

Example 8 provides the rotor assembly according to any of the previous examples, further including a plurality of tension-torsion straps, each tension-torsion strap attaching one of the plurality of rotor blade assemblies to the rotor hub.

Example 9 an aircraft having a tail rotor, the tail rotor including a rotor hub, a plurality of rotor blades, a plurality of pitch adapters, and a plurality of pitch horn joints. The rotor hub includes a pitch spider that has a central body and a plurality of pitch spider legs extending from the central body. Each rotor blade corresponds to one of the pitch spider legs. Each pitch adapter is joined to a respective one of the plurality of rotor blades, and each pitch adapter includes a pitch horn. Each of the pitch horn joints joins one of the plurality of pitch adapters to a corresponding one of the plurality of pitch spider legs. Each pitch horn joint includes a pitch horn joint bolt extending from the pitch horn of the pitch adapter to the pitch spider leg along a pitch horn joint axis, the pitch horn joint bolt fixed to the pitch horn of the pitch adapter; a spherical bearing having an inner ring and an outer ring; and a slider sleeve coupled to the spherical bearing, the slider sleeve enabling the pitch horn to translate relative to the pitch spider leg along the pitch horn joint axis.

Example 10 provides the aircraft according to example 9, where the outer ring of the spherical bearing is fixed to the pitch spider leg, and the inner ring of the spherical bearing is coupled to the slider sleeve.

Example 11 provides the aircraft according to example 9 or example 10, where the slider sleeve is fixed to the pitch horn joint bolt, and the slider sleeve is configured to slide along the inner ring of the spherical bearing to translate the pitch horn.

Example 12 provides the aircraft according to example 9, where the inner ring of the spherical bearing is fixed to the pitch horn joint bolt, and the outer ring of the spherical bearing is coupled to the slider sleeve.

Example 13 provides the aircraft according to either of example 9 or example 12, where an outside of the slider sleeve is fixed to the pitch spider leg, and the outer ring of the spherical bearing is configured to slide along an inside of the slider sleeve to translate the pitch horn.

Example 14 provides the aircraft according to any of examples 9 through 13, where a bearing stress on the pitch horn joint is distributed across a width of the spherical bearing.

Example 15 provides the aircraft according to any of examples 9 through 14, where the pitch spider is configured to translate along a rotor hub axis, and a translation of the pitch spider along the rotor hub axis rotates each of the plurality of rotor blades about a respective pitch change axis.

Example 16 provides the aircraft according to any of examples 9 through 15, further including a plurality of tension-torsion straps, each tension-torsion strap attaching one of the plurality of pitch adapters to the rotor hub.

Example 17 provides a pitch horn joint between a pitch spider and a pitch adapter of a rotor blade, the pitch horn joint including a pitch horn joint bolt, a spherical bearing having an inner ring and an outer ring, and a slider sleeve coupled to the spherical bearing. The pitch horn joint bolt extends along a pitch horn joint axis from a pitch horn of the pitch adapter to a pitch spider leg of the pitch spider, the pitch horn joint bolt fixed to the pitch horn of the pitch adapter. The slider sleeve enables the pitch horn of the pitch adapter to translate relative to the pitch spider leg along the pitch horn joint axis.

Example 18 provides the pitch horn joint according to example 17, where the outer ring of the spherical bearing is fixed to the pitch spider leg, and the inner ring of the spherical bearing is coupled to the slider sleeve.

Example 19 provides the pitch horn joint according to either of examples 17 or 18, where the slider sleeve is fixed to the pitch horn joint bolt, and the slider sleeve is configured to slide along the inner ring of the spherical bearing to translate the pitch horn.

Example 20 provides the pitch horn joint according to any of examples 17 through 19, where a bearing stress on the pitch horn joint is distributed across a width of the spherical bearing.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A rotor assembly comprising:
   a rotor hub comprising a pitch spider, the pitch spider comprising a central body and a plurality of pitch spider legs extending from the central body;
   a plurality of rotor blade assemblies, each rotor blade assembly comprising a rotor blade, a pitch adapter joined to the rotor blade and connecting the rotor blade to the rotor hub, and a pitch horn; and
   a plurality of pitch horn joints each joining one of the plurality of rotor blade assemblies to a corresponding one of the plurality of pitch spider legs, each pitch horn joint comprising:
      a pitch horn joint bolt extending from the pitch horn of the rotor blade assembly to the pitch spider leg along a pitch horn joint axis, the pitch horn joint bolt fixed to the pitch horn;
      a spherical bearing having an inner ring and an outer ring; and
      a slider sleeve coupled between the spherical bearing and the pitch horn joint bolt, the slider sleeve enabling the pitch horn to translate relative to the pitch spider leg along the pitch horn joint axis.

2. The rotor assembly of claim 1, wherein the outer ring of the spherical bearing is fixed to the pitch spider leg, and the inner ring of the spherical bearing is coupled to the slider sleeve.

3. The rotor assembly of claim 1, wherein the slider sleeve is fixed to the pitch horn joint bolt, and the slider sleeve is configured to slide along the inner ring of the spherical bearing to translate the pitch horn.

4. The rotor assembly of claim 1, wherein a bearing stress on the pitch horn joint is distributed across a width of the spherical bearing.

5. The rotor assembly of claim 1, wherein the pitch spider is configured to translate along a rotor hub axis, and a translation of the pitch spider along the rotor hub axis rotates each of the plurality of rotor blade assemblies about a respective pitch change axis.

6. The rotor assembly of claim 1, further comprising a plurality of tension-torsion straps, each tension-torsion strap attaching one of the plurality of rotor blade assemblies to the rotor hub.

7. The rotor assembly of claim 1, wherein the slider sleeve has a slide zone along which the inner ring can translate, the slide zone having a length that is greater than a width of the spherical bearing.

8. The rotor assembly of claim 1, wherein the slider sleeve provides a translational degree of freedom in the pitch horn joint.

9. The rotor assembly of claim 1, further comprising a nut fastening the pitch horn joint bolt and the slider sleeve to the pitch horn.

10. The rotor assembly of claim 9, further comprising a spacer separating the nut from the pitch horn.

11. An aircraft comprising a tail rotor, the tail rotor comprising:
    a rotor hub comprising a pitch spider, the pitch spider comprising a central body and a plurality of pitch spider legs extending from the central body;
    a plurality of rotor blades, each of the plurality of rotor blades corresponding to one of the plurality of pitch spider legs;
    a plurality of pitch adapters, each pitch adapter joined to a respective one of the plurality of rotor blades, and each pitch adapter comprising a pitch horn; and
    a plurality of pitch horn joints each joining one of the plurality of pitch adapters to a corresponding one of the plurality of pitch spider legs, each pitch horn joint comprising:
        a pitch horn joint bolt extending from the pitch horn of the pitch adapter to the pitch spider leg along a pitch horn joint axis, the pitch horn joint bolt fixed to the pitch horn of the pitch adapter;
        a spherical bearing having an inner ring and an outer ring; and
        a slider sleeve coupled between the spherical bearing and the pitch horn joint bolt, the slider sleeve enabling the pitch horn to translate relative to the pitch spider leg along the pitch horn joint axis.

12. The aircraft of claim 11, wherein the outer ring of the spherical bearing is fixed to the pitch spider leg, and the inner ring of the spherical bearing is coupled to the slider sleeve.

13. The aircraft of claim 11, wherein the slider sleeve is fixed to the pitch horn joint bolt, and the slider sleeve is configured to slide along the inner ring of the spherical bearing to translate the pitch horn.

14. The aircraft of claim 11, wherein a bearing stress on the pitch horn joint is distributed across a width of the spherical bearing.

15. The aircraft of claim 11, wherein the pitch spider is configured to translate along a rotor hub axis, and a translation of the pitch spider along the rotor hub axis rotates each of the plurality of rotor blades about a respective pitch change axis.

16. The aircraft of claim 11, further comprising a plurality of tension-torsion straps, each tension-torsion strap attaching one of the plurality of pitch adapters to the rotor hub.

17. A pitch horn joint between a pitch spider and a pitch adapter of a rotor blade, the pitch horn joint comprising:
    a pitch horn joint bolt extending along a pitch horn joint axis from a pitch horn of the pitch adapter to a pitch spider leg of the pitch spider, the pitch horn joint bolt fixed to the pitch horn of the pitch adapter;
    a spherical bearing having an inner ring and an outer ring; and
    a slider sleeve coupled between the spherical bearing and the pitch horn joint bolt, the slider sleeve enabling the pitch horn of the pitch adapter to translate relative to the pitch spider leg along the pitch horn joint axis.

18. The pitch horn joint of claim 17, wherein the outer ring of the spherical bearing is fixed to the pitch spider leg, and the inner ring of the spherical bearing is coupled to the slider sleeve.

19. The pitch horn joint of claim 17, wherein the slider sleeve is fixed to the pitch horn joint bolt, and the slider sleeve is configured to slide along the inner ring of the spherical bearing to translate the pitch horn.

20. The pitch horn joint of claim 17, wherein a bearing stress on the pitch horn joint is distributed across a width of the spherical bearing.

* * * * *